United States Patent [19]
Hlasnik et al.

[11] Patent Number: 5,925,096
[45] Date of Patent: Jul. 20, 1999

[54] METHOD AND APPARATUS FOR LOCALIZED PREEMPTION IN AN OTHERWISE SYNCHRONOUS, NON-PREEMPTIVE COMPUTING ENVIRONMENT

[75] Inventors: Wayne Richard Hlasnik, Tigard, Oreg.; Tom Scully, Willowbrook, Ill.

[73] Assignee: Intel Corporation, Santa Clara, Calif.

[21] Appl. No.: 08/779,077

[22] Filed: Jan. 8, 1997

Related U.S. Application Data

[63] Continuation of application No. 08/366,875, Dec. 30, 1994, abandoned.

[51] Int. Cl.$^6$ .......................................................... G06F 9/46
[52] U.S. Cl. ............................................ 709/103; 709/102
[58] Field of Search .................................... 709/100, 102, 709/103, 107, 101

[56] References Cited

U.S. PATENT DOCUMENTS

| | | | |
|---|---|---|---|
| 5,247,675 | 9/1993 | Farrell et al. | 709/103 |
| 5,414,848 | 5/1995 | Sandage et al. | 709/107 |
| 5,428,525 | 6/1995 | Cappelaere et al. | 364/148.04 |

OTHER PUBLICATIONS

No Author, "*Microsoft Windows*™ *Programmer's Reference*", vol. 1, Overview.
No Author, "*Microsoft* ™ *Multimedia Development Kit*" Programmer's Reference.

*Primary Examiner*—Majid A. Banankhah
*Attorney, Agent, or Firm*—Blakely, Sokoloff, Taylor & Zafman LLP

[57] ABSTRACT

An apparatus and method for controlling system resource access to a computer application program in an otherwise synchronous, non-preemptive operating environment. A periodic preemption mechanism (PPM) is used to provide periodic CPU access to a client application. Initially, the client application registers a callback address with the PPM. Subsequently, the PPM periodically initiates a preemptive event, upon which the PPM checks for certain critical conditions. If there are no critical conditions, then the PPM saves critical registers of the CPU, then calls the client application at its callback address. In response, the client application performs its function then returns control to the PPM. The PPM then restores the critical registers of the CPU and returns control to the application that was running when the preemptive event occurred. The PPM behaves in a manner in which the operating system is generally unaware of the preemption.

18 Claims, 6 Drawing Sheets

METHOD AND APPARATUS FOR LOCALIZED PREEMPTION IN AN OTHERWISE SYNCHRONOUS, NON-PREEMPTIVE COMPUTING ENVIRONMENT

This is a continuation divisional of application No. 08/366,875, filed Dec. 30, 1994, now abandoned.

BACKGROUND OF THE INVENTION

1. Field of the Invention

The present invention relates to the field of preemptive access of computing resources. Specifically, the present invention relates to preemptive access of computing resources in an otherwise synchronous, non-preemptive computing environment. A synchronous computing environment, as defined herein, refers to a computing environment in which only one application program is allowed to be run at a time, and non-preemptive, as defined herein, means that once an application program is running, no other application program nor the computing environment itself can preempt the program, i.e., the application program must terminate execution on its own. Although the preferred embodiment is described in terms of a computer conferencing application, the periodic preemption mechanism described herein can be used for various other types of computer applications which require periodic access to system resources.

2. Description of Related Art

A set of personal computers interconnected on a network can be effectively used as a data conferencing system. In such a system, each conference participant typically comprises a personal computer user having a computer, a screen display, a computer network interface and typically a mouse or cursor control device. Conference participants are linked together by a computer network. This network may comprise either a hardwired local area network (LAN) such as Ethernet, a telephone modem link or other conventional data communications network. Because the conference participants are linked via a computer network, the participants do not need to be located in the same physical space. Rather, an effective conference may be carried out as participants view common information on their local screen displays and manipulate information using their local cursor control devices or other input devices.

In a typical conferencing application, a group of conference participants linked via a network share common information pertaining to a particular meeting or topic under discussion. By sharing information between conference participants, each participant is able to view and manipulate the information dispersed during the meeting. Immediately after a meeting is initiated, a pool of information collected during the meeting begins to accumulate. As each conference participant makes modifications or additions to this pool of meeting information, the individual contributions must be circulated around to the other conference participants so that each participant has a complete and up-to-date copy of the meeting information. It will be appreciated that maintaining synchronization and currency of the meeting information among all conference participants is a difficult task and may involve the transfer of large amounts of information.

Taking the simple case of only two computer systems linked via the above computer conferencing scheme, one computer system is the host system and the other computer system is the guest system, or remote system. A computer application runs on the host system, while the guest system acts like a dumb terminal. The guest system transfers its inputs to the host system for processing, waits for the processed output, then updates its state and video display responsive to the processed output. In order for this scenario to work, either the host must periodically check the guest system for inputs which need to be processed or the guest system must somehow interrupt the host system when there are pending inputs.

A problem occurs when the above host-guest system configuration is employed in a synchronous, non-preemptive computing environment, such as the Windows operating system developed by Microsoft Corporation of Redmond, Wash. Microsoft is a trademark of Microsoft, Inc. Ordinarily in such a computing environment, there is no preemption means for the guest system to notify the host system of pending inputs. Instead, the guest system must wait patiently for the host system to check for input. In some circumstances the guest system is not serviced for many clock cycles. In the worst case, the guest system is never serviced and will appear to a user to be non-responsive.

Thus, a better manner of providing the guest system with periodic access to the host system's resources is desired.

SUMMARY AND OBJECTS OF THE PRESENT INVENTION

The present invention is an apparatus and method for providing a computer application with periodic preemptive access to system resources, in particular, CPU access, in an otherwise synchronous, non-preemptive operating environment such as the Windows operating system developed by Microsoft Corporation. Although the described embodiment is described with respect to a computer conferencing system, the periodic preemption mechanism (PPM) can be used with any type of computer application which requires timely updating; it is not limited to a computer conferencing system.

In a computer network, the host system includes an application which manages the input to and output from one or more guest systems. This application requires time-critical servicing when it has pending inputs. A periodic preemption mechanism (PPM) is initialized when this client application registers with the PPM. The client application registers by providing a callback address.

Subsequently, when the PPM receives an input from an asynchronous event, the PPM checks for any critical conditions. If there are no critical conditions, then the PPM saves critical registers of the CPU. The PPM then signals the client application at its callback address. This is done by means of a programmatic call, in the described embodiment. In response to the call, the client application performs its function and then returns control to the PPM. The PPM then restores the critical registers of the CPU and returns control to the application that it preempted. The PPM behaves in a manner in which the operating system is generally unaware of the preemption.

BRIEF DESCRIPTION OF THE DRAWINGS

FIG. 4 also shows a prior art method of providing an application program (AS 440) with CPU access by "hooking" into various system calls

DETAILED DESCRIPTION OF THE PREFERRED EMBODIMENT

The present invention is an apparatus and method for providing a computer application with periodic preemptive access to system resources, in particular, CPU access, in an otherwise synchronous, non-preemptive computing environment such as the Windows operating system developed by Microsoft Corporation. A synchronous computing environment, as defined herein, refers to a computing environment in which only one application program is allowed to be run at a time, and non-preemptive, as defined herein, means that once an application program is running, no other application program nor the computing environment itself can preempt the program, i.e., the application program must terminate execution on its own. In the following detailed description, numerous specific details are set forth in order to provide a thorough understanding of the present invention. However, it will be apparent to one of ordinary skill in the art that these specific details need not be used to practice the present invention. In other instances, well known structures, interfaces and processes have not been shown in detail in order not to unnecessarily obscure the present invention.

Figure 1:
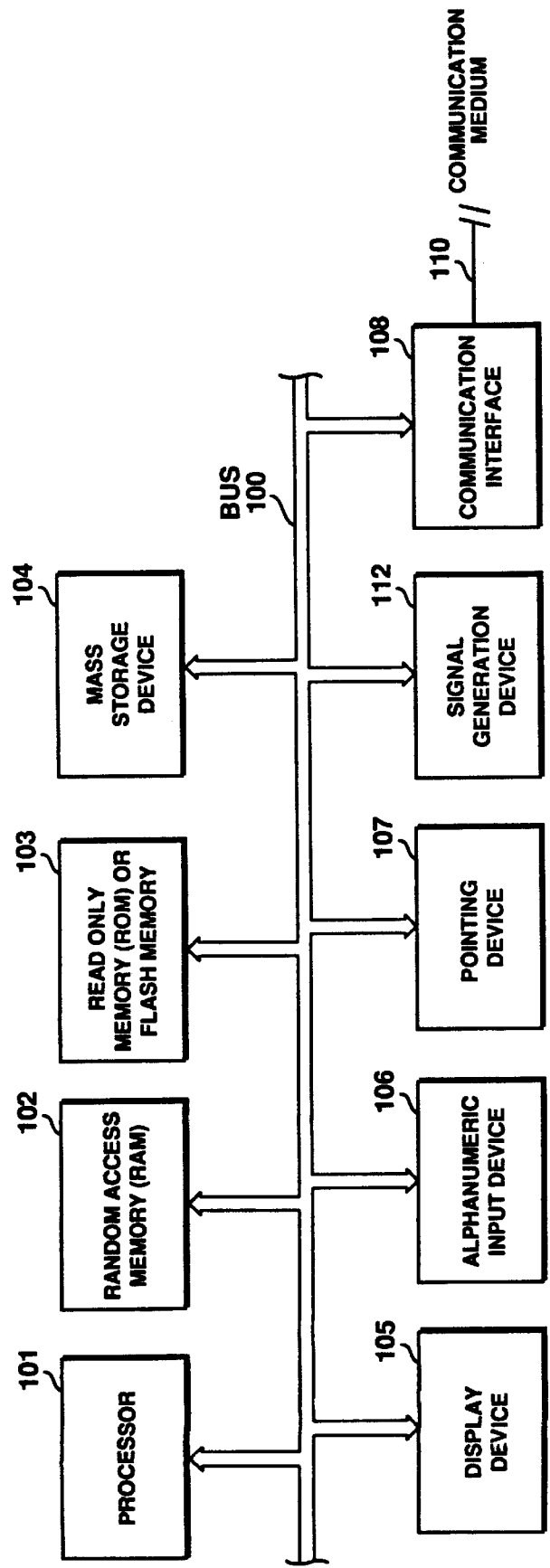
FIG. 1 is a block diagram illustrating the computer system hardware used in the preferred embodiment of the present invention.

Referring now to FIG. 1, a block diagram of the computer system hardware used in the preferred embodiment is illustrated. The computer system used in the preferred embodiment comprises a Bus 100 for communicating information between computer system components. These components coupled to Bus 100 include Processor 101, which is also referred to as the Central Processing Unit, or CPU. In the preferred embodiment, Processor 101 is an i486™ or Pentium™ brand microprocessor manufactured by Intel Corporation, Santa Clara, Calif. The i486 and Pentium marks are trademarks of Intel Corporation. Other system components include Random Access Memory (RAM) 102, Read Only Memory (ROM) 103, and mass storage device or disk drive 104. The computer system of the preferred embodiment also includes display device 105 coupled to the Bus 100 for displaying information to a computer user, an alphanumeric input device 106 coupled to the Bus 100 for communicating information and command selections to the Processor 101, a pointing device or cursor control device 107 coupled to the Bus 100 for communicating information and command selections to Processor 101, and a signal generation device 112 coupled to the Bus 100 for communicating command selections to the Processor 101. Display device 105 may be a liquid crystal device, cathode ray tube, or other suitable display device. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the screen display of display device 105. Many implementations of the cursor control device 107 are well known in the art, including trackball, mouse, joystick, or special keys on the alphanumeric input device 106 capable of signaling movement in a given direction. Signal generation device 112 is typically implemented as a button or switch located on or near the cursor control device 107. The physical proximity of cursor control device 107 and signal generation device 112 allows a user to manipulate both devices simultaneously with one hand. The signal generation device may be operated between two control states: an active control state typically initiated by depression of a mouse button, and an inactive control state typically initiated by releasing the mouse button.

The computer system used in the preferred embodiment also includes a communication interface 108. Communication interface 108 is coupled to communication medium 110. Communication interface 108 provides a means for the computer system to communicate with a network of other computer systems. A variety of other networks are well known in the art. These communication media 110 include well known Local Area Networks (LAN) such as Ethernet, Wide Area Networks (WAN), telephone modem links, or other well known and conventional computer networking technology. The configuration and interconnection of computer system components as illustrated in FIG. 1 is well known to those of ordinary skill in the art.

Figure 2:
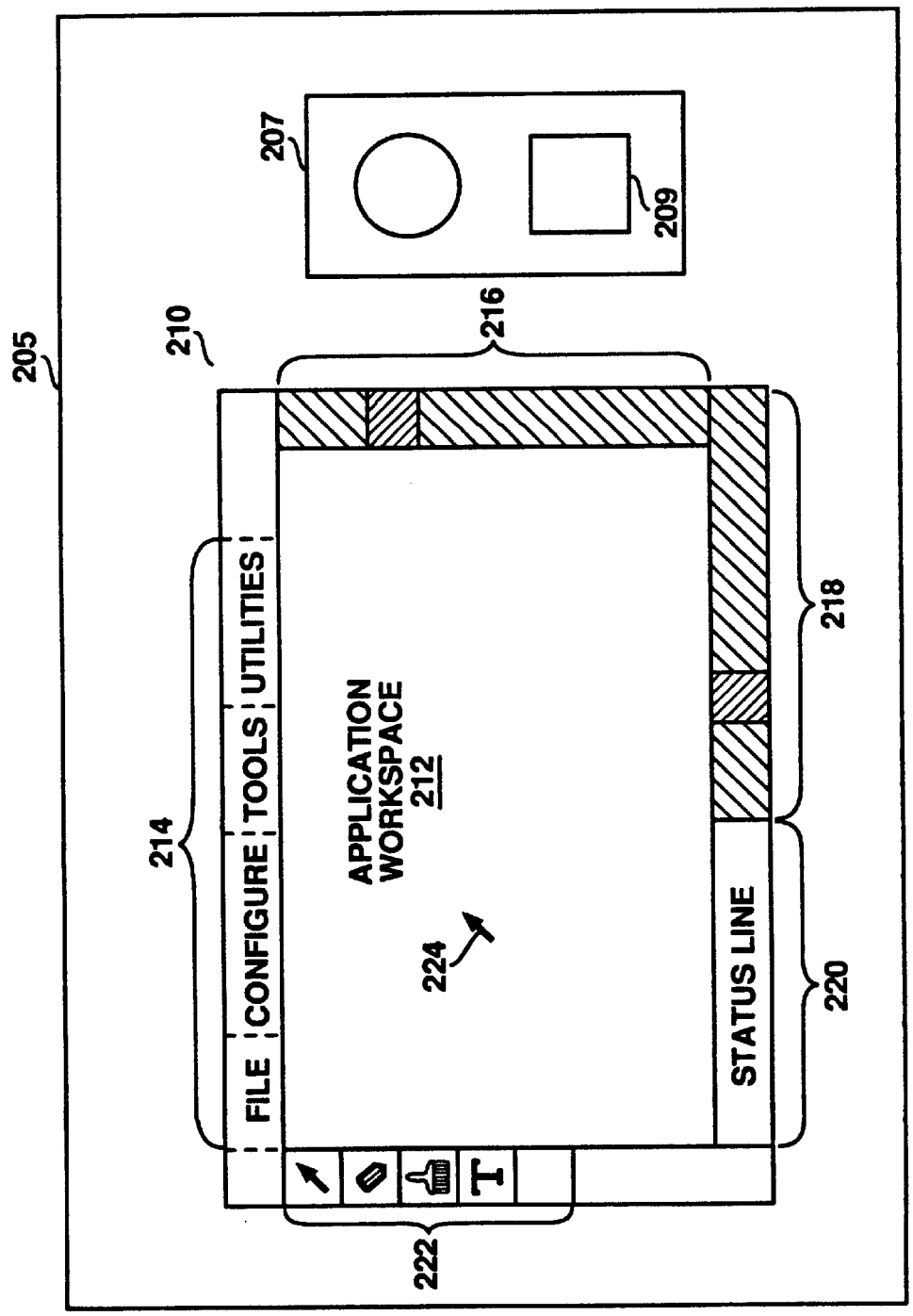
FIG. 2 illustrates a typical screen display provided in a conventional computer system.

FIG. 2 illustrates a screen display 210 on a conventional computer system. In addition, a cursor control device 207 (i.e. mouse) and signal generation device 209 (mouse button) is illustrated. Conventional screen display 210 comprises a displayed set or menu of function or command selections 214 displayed across the top of the screen display. In addition, tool selections 222 are displayed along a left hand edge of the screen display. Vertical scroll bar 216 and horizontal scroll bar 218 are also provided. A status line 220 provides a display region for various system status messages. This typical screen display 210 and corresponding user interface functionality is available in the prior art from various sources including the Windows operating system developed by Microsoft Corporation, or various operating systems and applications running on the Apple Macintosh brand computer systems manufactured by Apple Computer, Inc. of Cupertino, Calif. Microsoft is a trademark of Microsoft, Inc. Apple and Macintosh are trademarks of Apple Computer, Inc.

Screen display 210 includes an application workspace 212 in which a user may draw images or type text using one of tools 222. In addition, a cursor symbol 224 is displayed and responsive to the movement to cursor control device 207. Cursor 224 provides a means for pointing to various regions on screen display 210. Again, the use of cursor symbol 224 is well known to those of ordinary skill in the art.

Figure 3:
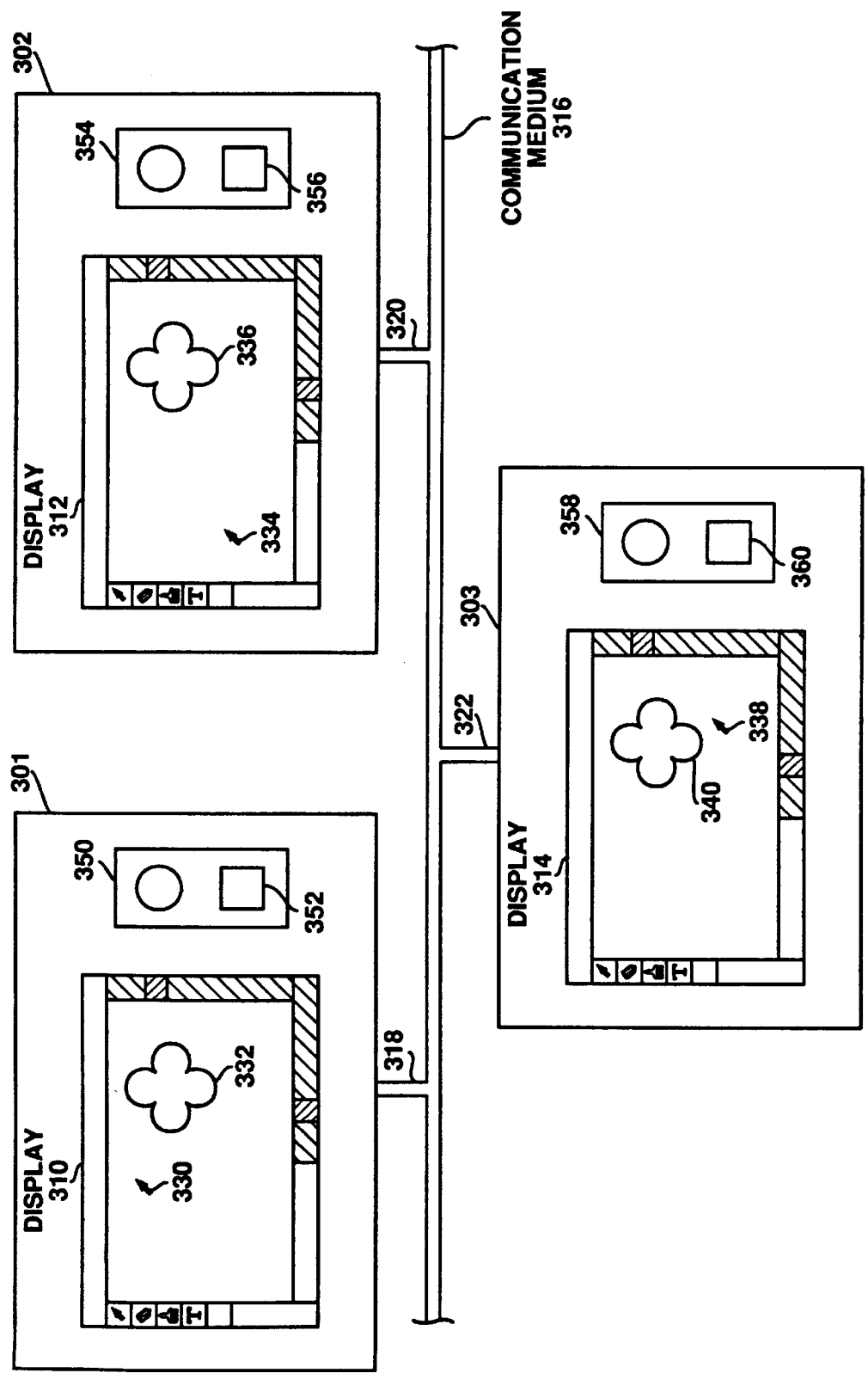
FIG. 3 illustrates a conventional computer system network having three independent computer-systems interconnected on a communication medium.

FIG. 3 illustrates a conventional computer network or conferencing system. This sample conferencing system includes three computer systems, 301, 302 and 303, all coupled via communication medium 316. As described earlier, these computer systems, 301, 302 and 303, and the communication medium 316 over which they communicate are well known to those of ordinary skill in the art. Conventional computer system 301 includes a screen display 310, cursor control device 350, and mouse button 352. Cursor control device 350 is used to manipulate cursor symbol 330 on display 310. Because cursor 330 of display 310 is manipulated using cursor control device 350 of the same computer system 301, cursor 330 is called the local cursor of computer system 301. Any arbitrary object 332 may be displayed on screen display 310. Similarly, computer system 302 comprises screen display 312, cursor control device 354, and signal generation device 356. Local cursor 334 of screen display 312 is controlled by cursor control device 354. Computer system 303 comprises screen display 314, cursor control device 358, and signal generation device 360. Local cursor 338 of the screen display 314 is controlled via cursor control device 358.

Prior art networking systems provide means for transferring objects from one computer system to another across communication medium 316. For example, object 332 displayed on display 310 may be transferred via interface 318 across communication medium 316 to computer system 302 and/or computer system 303. In this manner, object 332 may be displayed on display 312 as object 336 and/or displayed on display 314 as object 340. Thus, information may be shared among computer systems 301, 302, and 303. Typically, cursors 330, 334, and 338 act as local cursors to the computer systems on which they are displayed.

In such a computer conferencing network, one system is designated as the host system. It is the host system's job to control distribution of data to the other systems, which are called remote or guest systems. In FIG. 3, if system 301 is the host system, then systems 302 and 303 are the guest systems. It is possible that the host system designation may be changed during the conference, as another user may wish to take control of managing data.

Figure 4:
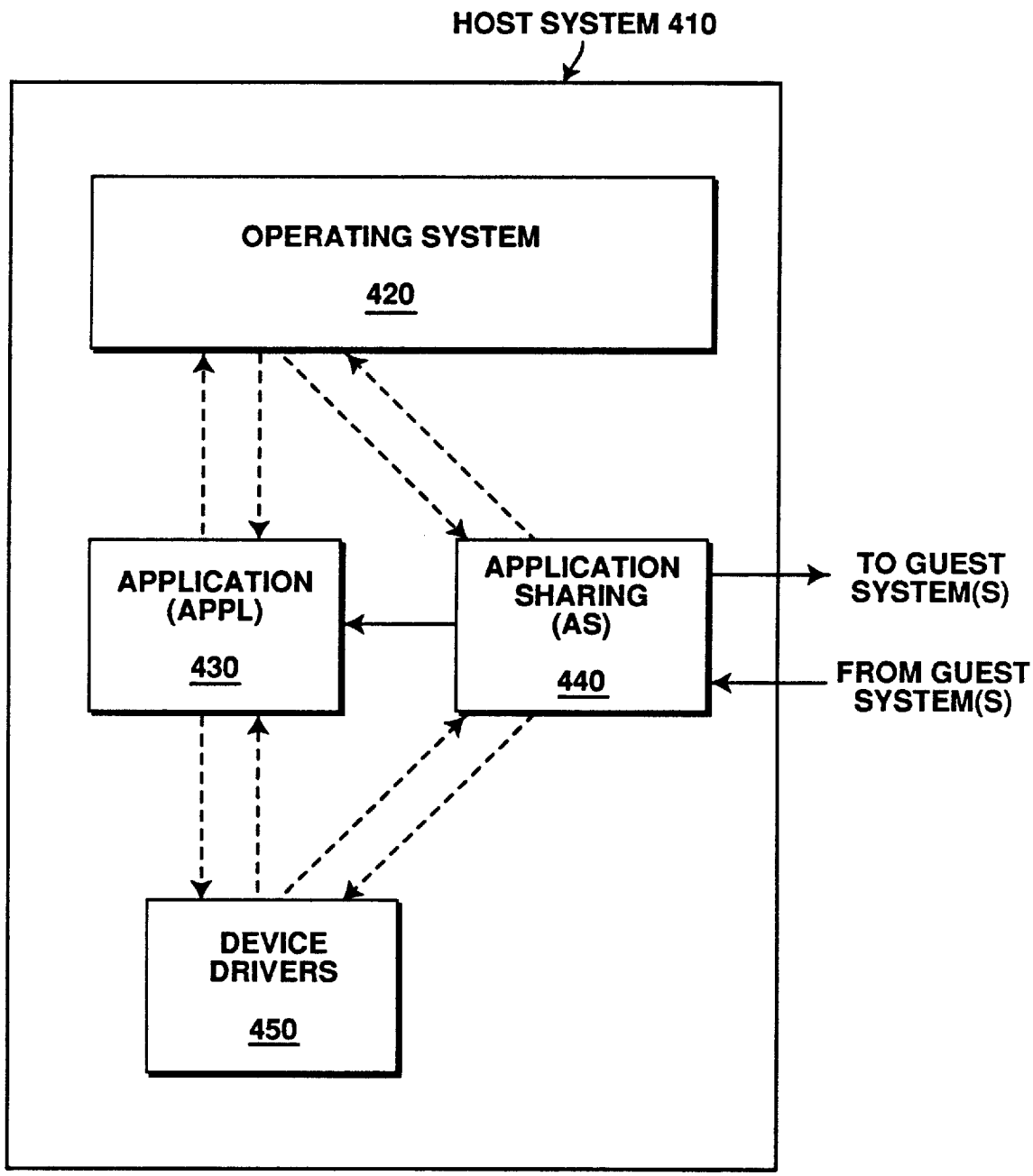
FIG. 4 is a block diagram showing the host system of a computer conferencing network.

FIG. 4 is a block diagram showing the host system 410 of the computer conferencing network. An operating system 420 runs on the host system 410. An application program (APPL) 430 runs under the operating system 420. APPL 430 is an application which is shared with the guest systems. For example, APPL 430 can be a word processing program, a graphical drawing program, or a spreadsheet.

Application sharing (AS) 440 is another application. Its job is to coordinate the communications between the host system 410 and the guest system (or systems). AS 440 typically controls various device drivers which send and receive data over communication medium 316.

APPL 430 is coupled to device drivers 450, which manage input and output to various devices such as the display device 105 (FIG. 1), the alphanumeric input device 106, the pointing device 107, the signal generation device 112, the mass storage device 104, and the communication interface 108. APPL 430 is also coupled to the operating system 420. In the described embodiment, the operating system 420 is the Windows operating system of Microsoft Corporation, and AS 440 is a dynamic link library (DLL) running under the Windows operating system. A DLL is an executable program which can be called by other application programs. However, the application 440 can be used more generally under other operating systems and is not limited to the Windows operating system. In one embodiment, the applications 440 could even be incorporated into the operating system itself. In the described embodiment, APPL 430 can be a DLL or an executable program.

Normally, in a non-preemptive operating system, AS 440 has no way of interrupting a currently executing application. So, if APPL 430 is currently executing, then AS 440 must wait for APPL 430 to yield from its access to the CPU before AS 440 can get CPU access. At the same time, however, an application has no way of yielding its CPU access in preference of giving access to a different application since the operating system may give CPU access to yet another application. Thus, even if APPL 430 had access to the CPU, it could not guarantee that AS 440 would gain CPU access upon relinquishment of its CPU access.

FIG. 4 indicates in dotted lines the interaction among the operating system 420, the applications 430 and 440, and the device drivers 450 showing a prior art method of providing AS 440 with access to the CPU by "hooking" into various system calls. Normally, there are various system calls by which APPL 430 is allowed to communicate with the operating system 420 and the device drivers 450. Typically, a lookup call address table is used to access these system calls. If APPL 430 is aware of the presence of AS 440 and wants to guarantee AS 440 access to the CPU, then APPL 430 can alter the normal lookup call address table of the operating system 420 and the device drivers 450. In particular, APPL 430 can alter the lookup call address table of the operating system 420 by substituting a lookup call address of its own into the operating system's lookup call address table. For example, if the operating system 420 has a dedicated system call for drawing a pixel to the screen, then APPL 430 can modify the lookup call address of this dedicated system call in the operating system 420 and substitute a pointer to its own routine, which can transfer control to AS 440 and then return control to the original pixel draw lookup call address. Thus, APPL 430 can "hook" into the operating system 420 such that each time it calls the operating system 420 to draw a pixel to the screen, it will first branch to its own routine which gives AS 440 CPU access. A similar "hook" can be used with the device drivers 450.

Thus, using this prior art method, APPL 430 can force control transfer to AS 440 by means of the system call whenever pending data need be sent to the guest systems. However, the problem of knowing when there is pending input from the guest systems still remains.

One drawback of this prior art method is that APPL 430 must know of the presence of AS 440 in order to place the "hooks" into the system calls. Normally, APPL 430 is unaware of the presence of AS 440. Thus, it would be more advantageous to have a method of providing AS 440 with CPU access which does not require a modification of behavior of APPL 430 dependent upon the presence of AS 440. Moreover, this prior art method requires APPL 430 to have intimate knowledge of the operating system 420 for placing these "hooks". It would be more desirable to have a method of providing AS 440 with CPU access which is operating system independent.

Figure 5:
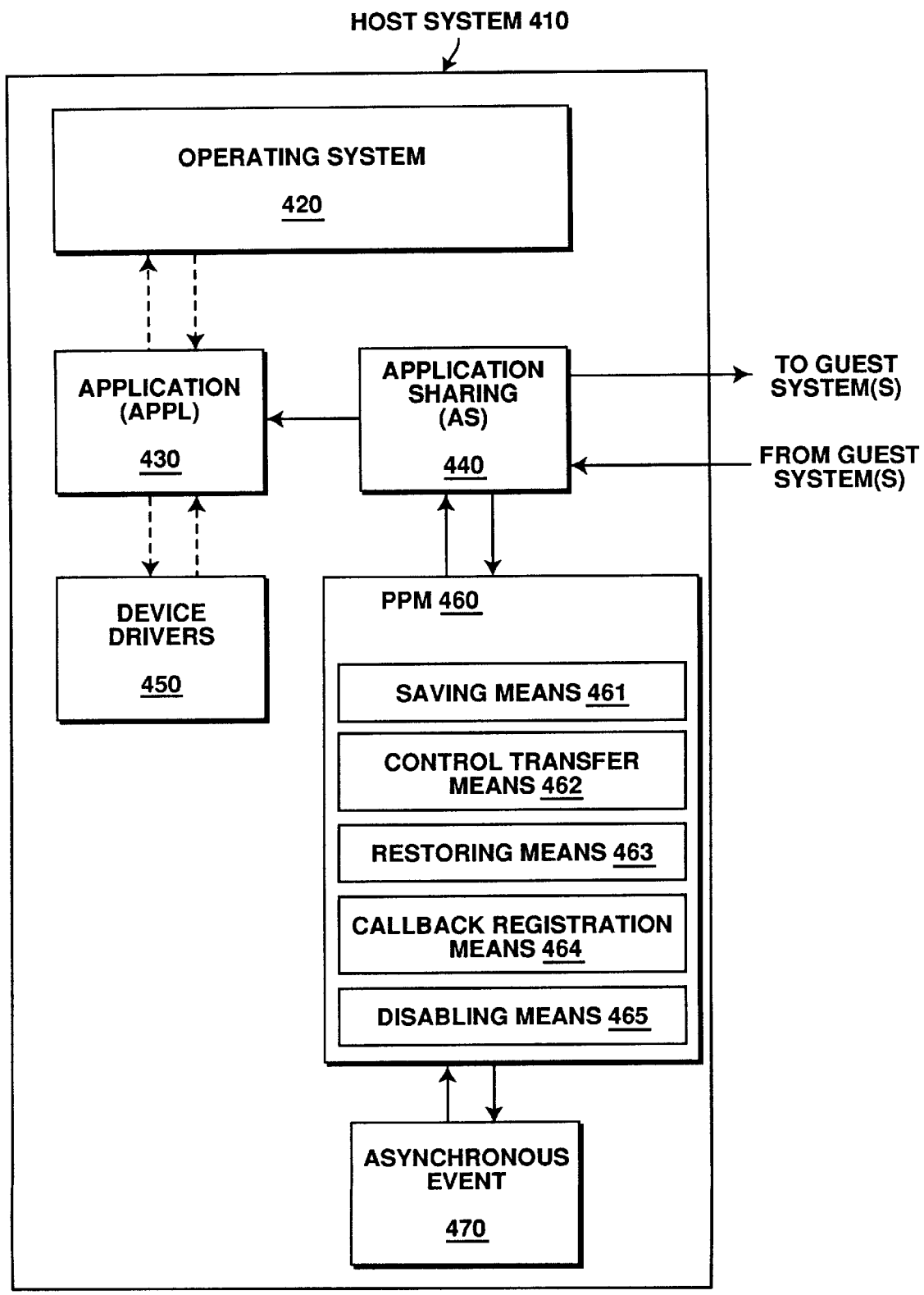
FIG. 5 illustrates a block diagram showing the host system of a computer system network which employs a periodic preemption mechanism (PPM).

FIG. 5 is a block diagram showing the host system 410 of the computer system network which employs a periodic preemption mechanism (PPM) 460. The operating system 420, APPL 430, AS 440, and device drivers 450 are the same as in FIG. 4.

In the preferred embodiment, a periodic preemption mechanism (PPM) 460 is coupled to AS 440. The PPM 460 allows a client application, such as AS 440, to register a callback address with it. Subsequently, the PPM 460 periodically signals the client application by means of a programmatic call. The client application can then perform its function and then return control to the PPM 460. A more detailed description of the PPM processing is described in FIG. 6.

The PPM 460 may have more than one client application. Time-critical applications are particularly good candidates. For example, these include applications which need CPU time slices for reliable communications, sound generation, or video display.

The PPM 460 includes a saving means 461, a control transfer means 462, a restoring means 463, a callback registration means 464, and a disabling means 465. The saving means 461 is for saving the state of the computing environment. This can include hardware and software used to save the registers of the processor and other state information. The control transfer means 462 is for transferring control to a client application. The restoring means 463 is for restoring the state of the computing environment and can include hardware and software used to restore the registers of the processor and other state information. The callback registration means 464 is for registering a callback address. For example, this could be a register, or it could be some instructions which store the callback address to memory. The disabling means 465 is for selectively disabling the PPM 460 from preempting a client application.

An asynchronous event generator 470 is coupled to provide an input to the PPM 460. The input from this asynchronous event generator 470 can be triggered by a variety of different things. For example, it can be triggered by an interrupt, a user input such as a mouse movement, an external device such as a motion detector, or an asynchronous timer. The asynchronous event generator 470 can also be triggered by "hooked" calls to the operating system, in particular calls which put the operating system in a state in which it does not yield to application programs. In response to an input from the asynchronous event generator 470, the PPM 460 will attempt to cause a preemptive event to allow its client application access to the CPU.

Figure 6:
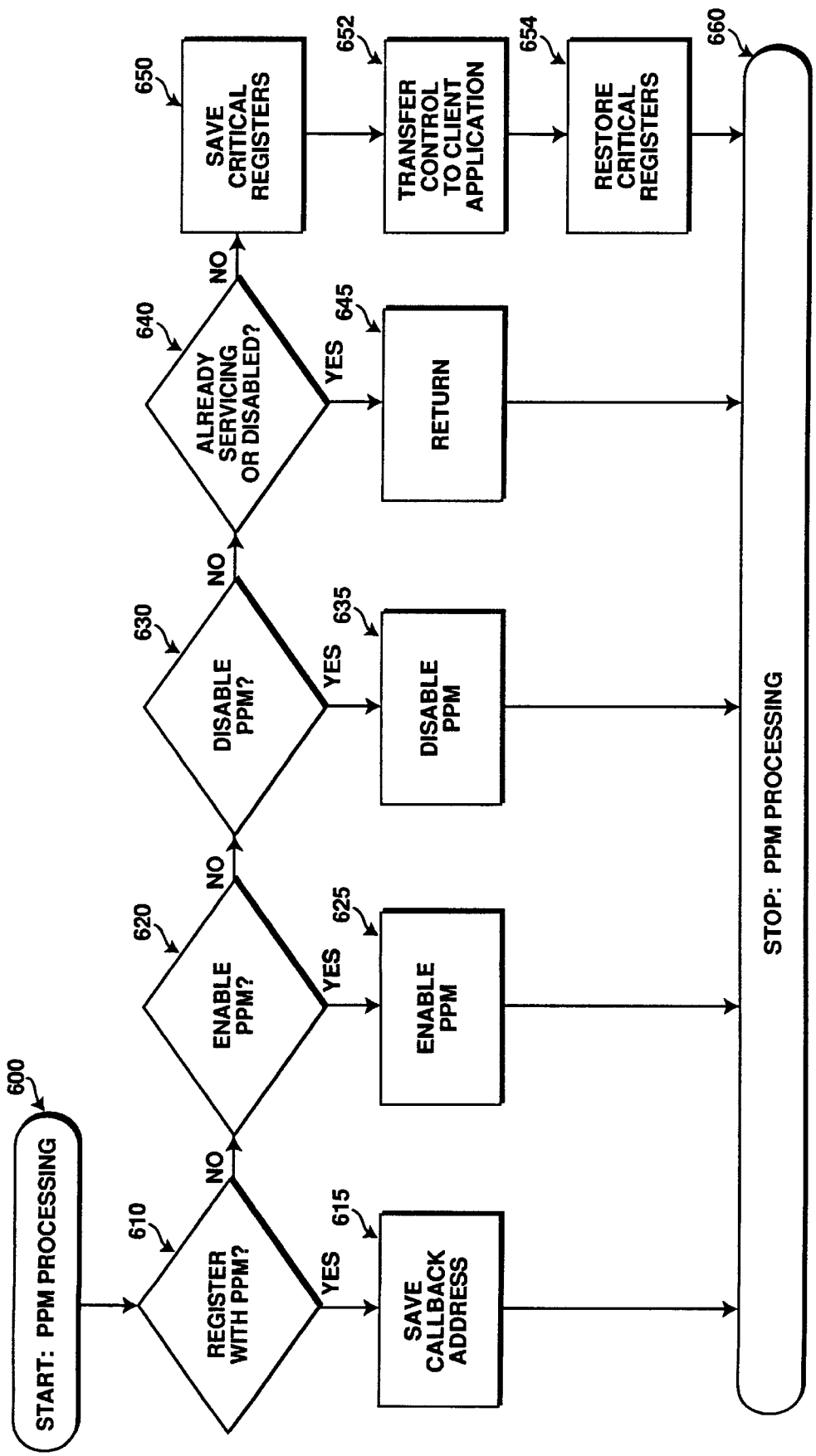
FIG. 6 is a flowchart of the processing of inputs in the PPM.

FIG. 6 is a flowchart of the processing of inputs in the PPM 460. Operation starts at a flowchart block 600. From the flowchart block 600, operation moves to a decision block 610.

At the decision block 610, if this is a request to register with the PPM 460, then operation moves to an operation block 615. At the operation block 615, a callback address provided by the registering application is saved.

However, if at the decision block 610, this is not a request to register with the PPM 460, then operation moves to a decision block 620, at which a determination is made whether this is a request to enable the PPM 460. Client applications can enable or disable the PPM 460 once they have registered. This allows the client applications to block preemption attempts when they are doing time-critical events. In the preferred embodiment, this enabling and disabling is performed by a software semaphore. At the decision block 620, if this is a request to enable the PPM 460, then operation moves to an operation block 625, at which the PPM is enabled for the requesting client application.

However, if at the decision block 620, this is not a request to enable the PPM 460, then operation moves to a decision block 630, at which a determination is made as to whether this is a request to disable the PPM 460. If this is a request to disable the PPM 460, then operation moves to an operation block 635, at which the PPM is disabled for the requesting client application.

However, if at the decision block 630, this is not a request for disabling the PPM 460, then operation moves to a decision block 640, at which a determination is made as to whether the PPM 460 is already processing an input from the asynchronous event generator 470, or whether the PPM 460 is disabled for a certain client application. If either of these two cases are true, then operation moves to an operation block 645, at which the input from the asynchronous event generator 470 is ignored. In the described embodiment, since the input from the asynchronous event generator 470 causes an interrupt to the PPM 460, a return instruction is used to ignore this recently received interrupt.

However, if at the decision block 640, neither the PPM 460 is already servicing a prior input from the asynchronous event generator 470 nor is the PPM 460 disabled for a certain client application, then operation moves to an operation block 650. At the operation block 650, the critical registers of the CPU are saved. This may be done in hardware (e.g., by a context switch) or in software (e.g., by storing each register to a memory location) and may require creating a private stack for storing the register data. Additionally, other state information of the operating system may need to be saved.

From the operation block 650, operation moves to an operation block 652, at which CPU access is transferred to the client application. In the preferred embodiment, this is done by means of a programmatic call. The client application then performs its function. For the protocol to work smoothly, the client application code should be relatively short in duration. Additionally, the client application should avoid making any calls to the operating system 420 that result in task switches.

After the client application returns control to the PPM 460, operation moves to an operation block 654, at which the critical registers of the CPU (and other state information of the operating system) are restored. From the operation blocks 615, 625, 635, 645, and 654, operation moves to a flowchart block 660, at which operation terminates.

The described method of using a PPM has the advantage over the prior art method in that the application can be independent of both the operating system and AS 440, i.e., it does not need to know specific addressing details of the operating system in order to do its job.

The described method solely provides the client application with a regular opportunity for CPU access. It does not make the client application more important by raising its priority nor by disabling any other applications. The described method behaves in a way compatible with the operating system such that the operating system is normally not aware of the PPM's preemption.

Thus, an apparatus and method for providing a computer application with periodic preemptive access to system resources, in particular, CPU access, in an otherwise synchronous, non-preemptive operating environment is disclosed. The specific arrangements and methods described herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

What is claimed is:

1. In a computer system having system resources and a synchronous computing environment under which a client application program can be executed, the computing environment not being configured for preempting a currently executing application program, the computing environment having a state which can be stored, a preemption apparatus for providing the client application program with access to the system resources, the preemption apparatus being independent of the synchronous computing environment, the preemption apparatus comprising:

means for saving the state of the synchronous computing environment;

means for transferring control to the client application program; and means for restoring the state of the synchronous computing environment.

2. The preemption means of claim 1 further comprising:
means for allowing the client application program to register a callback address, at which the transferring of control to the client application program occurs.

3. The preemption means of claim 2 further comprising:
means for temporarily disabling preemption of the client application program.

4. The preemption means of claim 1 wherein the computer system includes a processor, and the state of the computing environment is partially determined by certain registers of the processor.

5. In a computer system running under a synchronous computing environment not being configured for preempting a currently executing application program, the computing environment having a state which can be stored, a method for providing a client application program, running under the synchronous computing environment, with access to the system resources, the method comprising the steps of:

(a) providing input from an asynchronous event to a preemption means, the preemption means being independent of the synchronous computing environment; and (b) the preemption means determining whether preemption of the client application program is allowed, and responsive to an affirmative determination:
 (i) saving the state of the synchronous computing environment,
 (ii) transferring control to the client application program, and
 (iii) restoring the state of the synchronous computing environment.

6. The method of claim 5 wherein the asynchronous event is provided by an asynchronous timer.

7. The method of claim 5 wherein the asynchronous event is provided by a user input.

8. The method of claim 5 wherein the asynchronous event is provided by a call to the operating system.

9. The method of claim 5 wherein the determining if preemption of the client application program is allowed of step (b) further comprises the steps of:

(b1) determining whether a previous input from an asynchronous event is still being processed; and (b2) determining whether preemption of the client application program has been disabled.

10. The method of claim 5 wherein the computer system includes a processor, and the step (b)(i) of saving the state of the computing environment includes the step of saving registers of the processor.

11. A computer system comprising:

a host machine having system resources;

a communication channel for connecting the host machine to a guest machine, the communication channel for computer conferencing between the host machine and the guest machine;

an operating system running on and interactive with the host machine, the operating system not being configured for preempting an application program running under the operating system;

a first application program running on the host machine and interactive with the operating system;

a second application program running on the host machine for coordinating the data communication between the guest machine and the host machine, the second application program interactive with the operating system;

a preemption mechanism coupled to the second application program for providing the second application program with access to the system resources, the preemption mechanism being independent of the operating system; and an asynchronous event generator coupled to the preemption mechanism for providing an input thereto.

12. The computer system of claim 11 wherein the system resources provided by the preemption means include processor access.

13. The computer system of claim 11 wherein the periodic preemption mechanism is a computer program.

14. The computer system of claim 11 wherein the preemption means is a dynamic link library.

15. The computer system of claim 11 wherein the operating system is a windows-based operating system.

16. The computer system of claim 11 wherein the asynchronous event generator is an asynchronous timer.

17. The computer system of claim 11 wherein the asynchronous event generator is triggered by a user input.

18. The computer system of claim 11 wherein the asynchronous event generator is triggered by a call to the operating system.

* * * * *